United States Patent Office 3,541,186
Patented Nov. 17, 1970

---

3,541,186
PROCESS FOR POLYMERIZING NITRILE MONOMERS WITH ALPHA OLEFINS IN THE PRESENCE OF A TERPENE
Yoon Chai Lee, Springfield, Mass., assignor to Monsanto Company, St. Louis, Mo., a corporation of Delaware
No Drawing. Filed Jan. 2, 1968, Ser. No. 694,856
Int. Cl. C08f 15/04, 15/22
U.S. Cl. 260—878                                7 Claims

ABSTRACT OF THE DISCLOSURE

Disclosed herein is an improvement in a process for the polymerization of interpolymers of ethylenically unsaturated monomers containing nitrile groups with at least one lower alpha-olefin containing from 2 to 10 carbon atoms, wherein at least 55% by weight of the interpolymer is the nitrile-containing moiety. The improvement comprises the use of particular terpenes, such as dipentene, as chain transfer agents in the polymerization process. As a result of such use, products with improved color and clarity are obtained.

BACKGROUND OF THE INVENTION

Field of the invention

This invention relates to a process for the production of inter-polymers of good color and clarity which may, in film form, be used as packaging materials. More particularly, it relates to an improvement in a process for the production of interpolymers of nitrile-containing monomers with lower alpha-olefins of from 2 to 10 carbon atoms, the improvement comprising the use of certain terpenes as chain transfer agents during polymerization.

Description of the prior art

The currently available synthetic polymers which are used in the preparation of packaging materials for foodstuffs, medicines, and related substances are characterized by one or more serious deficiencies which detract from their packaging utility. Most synthetic polymers with good thermoforming or processing characteristics have a high rate of oxygen permeability and water vapor transmission so that foods and medicines packaged in these materials suffer water gain or loss, oxidation, discoloration, loss of taste, aroma, etc., thereby losing their customer appeal. For example, vinylidene copolymers have sufficient oxygen impermeability to permit their use in some food packaging applications, but these copolymers exhibit poor heat seal characteristics, poor draw properties, low heat distortion temperatures and thermoforming stability, low modulus and low strength which seriously limit their widespread use. Other polymer systems such as fully hydrolyzed polyvinyl alcohol have very high resistance to oxygen permeability but these systems have serious deficiencies in that they are water sensitive and have a very high water vapor transmission rate. These polyvinyl alcohol polymers fail to retain their resistance to oxygen permeability at conditions of high humidity and, further, have poor processing characteristics in general.

A class of packaging materials exists which overcomes most of these difficulties. These materials are based upon interpolymers of ethylenically unsaturated monomers containing nitrile groups with at least one alpha-olefin containing from 2 to 10 carbon atoms, wherein the nitrile-containing component comprises at least 55 weight percent of the interpolymer composition. These interpolymers, however, tend to develop color during processing. This problem is particularly acute where acrylonitrile is used as the nitrile-containing monomer, the color developing being a dark reddish-yellow. While the formation of color does not affect the useful physical properties of the interpolymers, e.g., high resistance to oxygen permeability and low water vapor transmission rates, it does tend to retard consumer acceptance of them from an aesthetic standpoint, the preference being for transparent, colorless materials.

A need therefore exists for a process for producing such interpolymers which will render them relatively immune to the color-producing reactions which take place during subsequent processing steps, thereby permitting production of transparent, colorless, commercially acceptable films and packages.

SUMMARY OF THE INVENTION

The tendency of certain free radical-polymerizable materials to polymerize to very high molecular weight polymers under normal polymerization conditions is already well known. These very high molecular weight polymers may have the disadvantage of being difficultly processable, i.e., unable to be processed without the use of special processing equipment, except at temperatures so high as to have a detrimental effect on the strength and color of the processed polymer.

Various techniques have been proposed for regulating the molecular weights of such polymers so as to make them more easily processable. For example, the polymerization temperature may be raised, but this increases the danger of a runaway polymerization. A mercaptan may be used as a chain transfer agent, but this contributes a very unpleasant odor to the polymers. Certain terpenes such as terpinoline may be used, but interpolymers thus prepared develop undesirable color during processing. It is, therefore, an object of this invention to provide a process for the production of interpolymers of alpha,beta-ethylenically unsaturated nitriles with alpha-olefins containing from 2 to 10 carbon atoms which interpolymers will remain substantially colorless and transparent throughout subsequent processing steps.

DESCRIPTION OF THE PREFERRED EMBODIMENTS

The above and other objects are attained by conducting the polymerization of free radical-polymerizable materials in the presence of 0.05–5% based on the weight of the free radical-polymerizable materials, of a terpene of the structure:

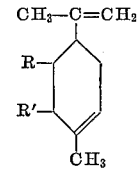

wherein R and R' are independently selected from the group consisting of hydrogen, alkyl radicals of 1–4 carbon atoms and halogen atoms. By alkyl radicals of 1–4 carbon atoms is meant substituents such as methyl groups, ethyl groups, propyl groups, isopropyl groups, n-butyl groups, isobutyl groups, tert-butyl groups and sec-butyl groups. The preferred terpene is dipentene.

The amount of molecular weight regulator employed in the practice of the invention is in the range of 0.05–5% usually 0.1–3% based on the weight of the free radical-polymerizable material. The terpenes of this invention are ineffective as molecular weight regulators at concentrations below about 0.05%. Concentrations higher than 5% are usually undesirable, either because the higher concentration causes too great a reduction of the molecular weight of the polymer or because the amount of molecular weight regulator which becomes chemically-combined to the polymer is large enough to affect noticeably the polymer properties other than the properties attributable to molecular weight. A particular advantage of the molecular weight regulators of the invention is the ability to act as molecular weight regulators, at such low concentrations, that substantially their only contribution other than improvement in color of the final product is an improvement in processability.

The polymerization of the free radical-polymerizable material in the presence of the molecular weight regulators of this invention may be accomplished by any of the mass, suspension or emulsion polymerization techniques conventionally employed for the polymerization of such materials, usually at temperatures in the range of 30–200° C. at atmospheric, subatmospheric or superatmospheric pressure. The reaction mixture should contain a free radical polymerization initiator, such as a peroxy or azo compound, a persulfate and any ingredients required by the particular polymerization technique employed, e.g., water, an emulsifying agent, a suspending agent, etc. Optional ingredients, such as antioxidants, plasticizers, can also be included in the reaction mixture if desired.

It is within the scope of the invention to conduct the polymerization in the presence of a preformed polymer, e.g., polybutadiene, a rubbery butadiene-styrene copolymer or the like, in order to graft polymeric chains of the free radical-polymerizable material onto the preformed polymer backbone. The molecular weight regulators serve to shorten the chains grafted onto the polymer backbone as well as to lower the molecular weight of any coformed, ungrafted polymer of the free radical-polymerizable material.

In order for films of the products of the process of this invention to exhibit acceptable levels of water vapor transmission and oxygen permeability the nitrile-containing monomer component must be present in an amount of at least 55 weight percent of the total polymer weight. In general, these physical properties will improve as the concentration of nitrile-containing component increases up to an upper limit of about 98% by weight. Thus, a more preferred range for the nitrile-containing component is 60–98% by weight and the most preferred range is from 78–98 weight percent. The upper limit of 98% is critical in order to maintain a low rate of water transmission and to provide a material that is readily processable into bottles, containers, sheets and films and exhibits high clarity, transparency and absence of color. For example, even in the presence of the molecular weight regulator of this invention, a homopolymer of methacrylonitrile will assume a dark red color upon processing, probably due to degradation. As is true with the high acrylonitrile-containing copolymers of the prior art prepared in the absence of the terpenes of this invention, such a dark red color is not acceptable for materials to be used in packaging since it does not provide the consumer with the true view of the contents of the package. It is believed that degradation of polymethacrylonitrile is due to the necessity for high heating upon processing in order to overcome the crystalline forces within the polymer so that a melt can be achieved. It is also believed that the presence of at least one comonomer in the nitrile-containing copolymers of this invention either prevents long sequences of nitrile-containing polymer placement which gives rise to crystallinity or minimizes crystal size and perfection; thus an interpolymer is provided with a lower melting temperature range and good flow behavior at relatively low temperatures thereby precluding the use of temperatures high enough to cause degradation.

Any interpolymerizable monomer containing both one or more double bonds and at least one nitrile group may be used in the practice of this invention. Examples of these include acrylonitrile, methacrylonitrile, methylene glutaronitrile, (2,4-dicyanobutene-1), vinylidene cyanide, crotonitrile, fumarodinitrile, maleodinitrile. Mixtures of such nitriles as these may also be used.

The balance of the interpolymer is prepared from one or more lower alpha-olefins of from 2 to 10 carbon atoms which are interpolymerizable with the nitrile-containing monomer. Examples of such interpolymerizable monomers include ethylene, propylene, butene, pentene, hexene, heptene, octene, nonene, decene and isomers thereof. An especially preferred comonomer is isobutylene.

Where packaging films are prepared from the polymers produced by the process of this invention, they may be prepared by extrusion, pressing, calendering, casting or by any other means well known to those skilled in the art. Bottles and containers may be made by any of the conventional methods such as blow extrusion, injection molding, vacuum forming, casting, etc. Where films of the products of the process of this invention are subjected to uniaxial or biaxial orientation, the water vapor transmission rates will be further improved.

The products of the process of this invention may also be used in other areas of application where thermoplastics are conventionally employed, e.g., as resins for molding, diecasting, coating, and the like.

The following examples are given in illustration of the invention and are not to be construed as limitations thereof. All parts and percentages are by weight unless otherwise indicated.

*Example 1*.—400 grams of water is placed in a suitable reaction vessel and 11.5 grams of Triton X–200 and 1.6 grams of Triton X–100 are dissolved therein. (Triton X–100 and Triton X–200 are commercially available surfactants produced by the Rohm and Haas Corporation. Triton X–100 is understood to be isooctyl polyethoxy ethanol and Triton X–200 is understood to be the sodium salt of an alkylaryl polyether sulfonate.) Next is added 37 grams of a 4% aqueous solution of potassium persulfate followed by 1.9 grams of dipentene. Finally, 162 grams of methacrylonitrile and 32 grams of isobutylene are introduced into the solution. The polymerization reaction is carried out for 19 hours at 60° C. under agitation, forming a stable emulsion having a solids content of 24.2%. 0.583 gram of 2,6-di-t-butyl p-cresol is added and then residual monomers are removed by stripping. After stripping, the resin is freeze-coagulated and thoroughly washed with water, followed by a methanol wash, followed by another water wash. A film of the resulting material is found to be clear and transparent and, under tensile stress, fails at 12,000 p.s.i. and 9% elongation. The film also has good resistance to oxygen permeability and a low rate of water vapor transmission.

*Example 2 (control)*.—Example 1 is repeated substituting as molecular weight regulator terpinolene in place of the dipentene of Example 1. It is found, that although the physical properties other than color are essentially the same as those of the product of Example 1, the color of a film of the product of Example 2 is seen to have a yellowish cast when compared to a film of like thickness prepared according to Example 1 and the film has a generally unattractive appearance.

*Example 3*.—60 grams of an 80/20 butadiene/acrylonitrile rubber latex containing 32% solids is charged to a reaction vessel. To this is added 150 grams of water, 11.5 grams of Triton X–200, 1.6 grams of Triton X–100, 37 grams of a 4% aqueous solution of potassium sulfate and 1.9 grams of dipentene. To this mixture is added 162 grams of methacrylonitrile and 32 grams of isobutylene. Polymerization is carried out under agitation for 19 hours at 60° C. The reaction vessel is vented and 0.640 gram of 2,6-di-t-butyl p-cresol and 0.0576 gram of tris-(nonylphenyl) phosphite is added to the emulsion. Excess monomer is removed by stripping. The solids content of the emulsion is 23.1%. The polymer is freeze-coagulated and given three washes in the sequence water-methanol-water. Upon pressing a film from the resin so formed it is found to be water-white and transparent and, under tensile stress, fails at 9,400 p.s.i. and 22% elongation.

*Example 4*.—Example 1 is repeated using 160 parts of acrylonitrile, and 0.5 part of dipentene. Again, the physical properties of the product thus formed are equivalent to the properties of the product of Example 1 and, in particular, films formed therefrom are transparent and essentially colorless, being only very slightly more yellowish than those of Example 1.

Example 5 (control).—Example 4 is repeated substituting terpinolene for dipentene. Films derived from this material are found to be translucent and of a dark reddish-yellow color.

Example 6.—Example 1 is repeated substituting alpha-methylene glutaronitrile for methacrylonitrile. Again, an interpolymer is obtained that yields upon extrusion a transparent, essentially colorless film with a low oxygen permeability and a low rate of water vapor transmission.

It is seen from the above examples that the presence of dipentene during polymerization causes an interpolymer to be formed which may be processed into a transparent, colorless film. By way of contrast, other molecular weight regulators, exemplified here by terpinolene, are lacking in the power to produce this desirable result. This is particularly surprising and unexpected in view of the close structural resemblance of the two terpenes, i.e., dipentene is a racemic mixture of di- and l-limonene:

while terpinolene is:

It is believed that the difference lies in the fact that in the terpenes of this invention, e.g. dipentene, two carbon atoms separate the double bonds, whereas in terpenes such as terpinolene, only one carbon atom lies between the double bonds. Thus, on being attacked by a radical, terpinolene-type terpenes can rearrange to form a compound having conjugated double bonds which are likely to be colored. On the other hand, terpenes of the dipentene type will not be conjugated upon rearrangement and thus, color will not develop. This mechanism is only a theory to explain the observed effect, however, and it is not intended that the scope of the invention should in any way be limited thereby.

It will be obvious to those skilled in the art, that many deviations may be made in the products and processes set forth above without departing from the scope of this invention.

What is claimed is:

1. In a process for the interpolymerization, in the presence of a free-radical generating initiator, of at least one ethylenically unsaturated monomer containing at least one nitrile group with at least one interpolymerizable alpha-olefin containing from 2–10 carbon atoms; wherein said nitrile-containing monomer is present in the interpolymer in a concentration of at least 55% by weight but no more than 98% by weight and said alpha-olefin is correspondingly present in the interpolymer in a concentration of at least 2% by weight but not more than 45% by weight; the improvement which comprises adding to the interpolymerization reaction mixture from 0.05 to 5% by weight, based on the weight of the interpolymerizable reactive species of a terpene of the structure

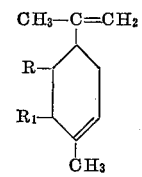

wherein R and $R_1$ are independently selected from the group consisting of hydrogen, alkyl radicals of 1–4 carbon atoms and halogen atoms.

2. The process of claim 1 wherein the nitrile-containing monomer is methacrylonitrile.

3. The process of claim 1 wherein the nitrile-containing monomer is acrylonitrile.

4. The process of claim 1 wherein the nitrile-containing monomer is alpha-methylene glutaronitrile.

5. The process of claim 1 carried out in the presence of a minor proportion by weight of a rubber and a major proportion by weight of the interpolymerizable reactive species.

6. The process of claim 1 wherein the alpha-olefin is isobutylene.

7. The procees of claim 1 wherein the terpene is dipentene.

References Cited
UNITED STATES PATENTS

| | | |
|---|---|---|
| 2,129,478 | 9/1938 | Darmstadt. |
| 2,377,095 | 5/1945 | Muskat. |
| 2,537,146 | 1/1951 | Lytton. |
| 2,537,626 | 1/1951 | Eberly et al. |
| 2,549,913 | 4/1951 | Lytton. |
| 2,556,488 | 6/1951 | Wakeford et al. |
| 2,606,176 | 8/1952 | Dunn. |

HARRY WONG, Jr., Primary Examiner

U.S. Cl. X.R.

260—29.6, 78.5, 85.5